2 Sheets--Sheet 1.

D'A. T. GALE.
Nut and Coffee Roasters.

No. 139,054. Patented May 20, 1873.

Witnesses:
A. Bennersendorf.
Sedgwick

Inventor:
D'A. T. Gale
PER
Attorneys.

2 Sheets--Sheet 2

D'A. T. GALE.
Nut and Coffee Roasters.

No. 139,054. Patented May 20, 1873.

Witnesses:
A. Bennermendorf.
C. Sedgwick

Inventor:
D'A. T. Gale
per
Attorneys.

AM. PHOTO-LITHOGRAPHIC CO. N.Y. (OSBORNE'S PROCESS.)

UNITED STATES PATENT OFFICE.

D'ALEMBERT T. GALE, OF FORT WAYNE, INDIANA.

IMPROVEMENT IN NUT AND COFFEE ROASTERS.

Specification forming part of Letters Patent No. 139,054, dated May 20, 1873; application filed December 9, 1872.

*To all whom it may concern:*

Be it known that I, D'ALEMBERT TILLOTSON GALE, of Fort Wayne, in the county of Allen and State of Indiana, have invented a new and Improved Roaster for Nuts, Coffee, &c., of which the following is a specification:

The object of this invention is to produce a simple and cheap arrangement for roasting nuts, coffee, &c., in connection with a hot-air or heating counter; also, the providing a reliable motor arrangement to carry on the rotation of the roasting-cylinder, thereby obviating the tedious labor of hand-turning.

This invention consists in the arrangement, in connection with a nut-roasting cylinder, of an escapement-wheel, clutch, pawls, and pendulum, in connection with a spring driving mechanism, whereby an intermittent rotary motion is given to the roasting-cylinder; the mechanism being so constructed and arranged in relation to the roasting cylinder that in winding up the springs, which constitute the motor, the roasting-cylinder is revolved the reverse way, thereby giving the contents thereof a thorough mixing, avoiding burning, &c., as will be hereinafter explained.

Figure 1:
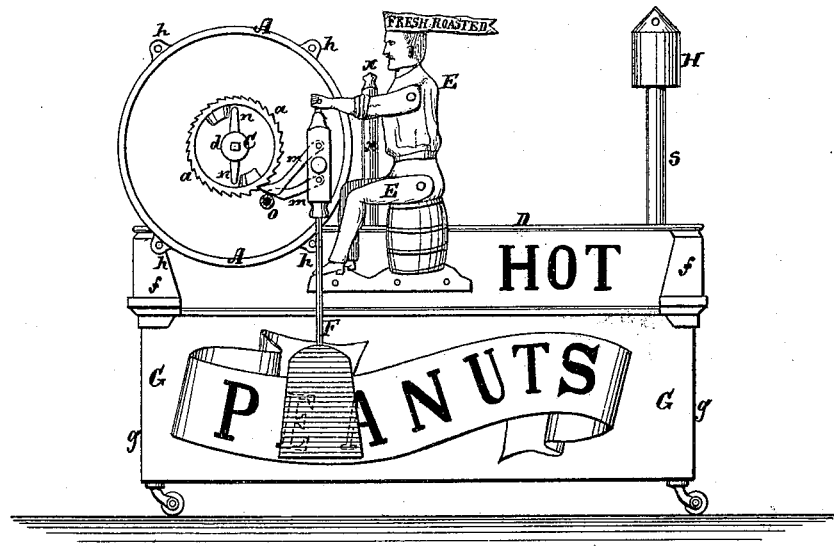
Figure 2:
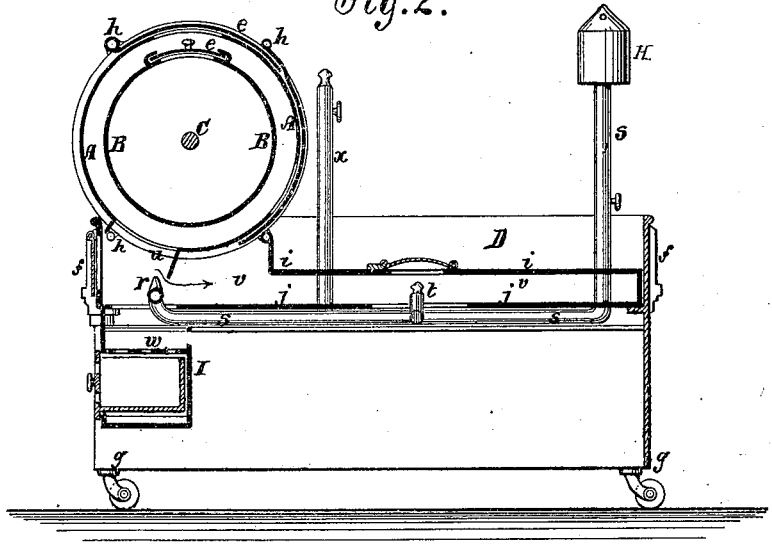
Figure 3:
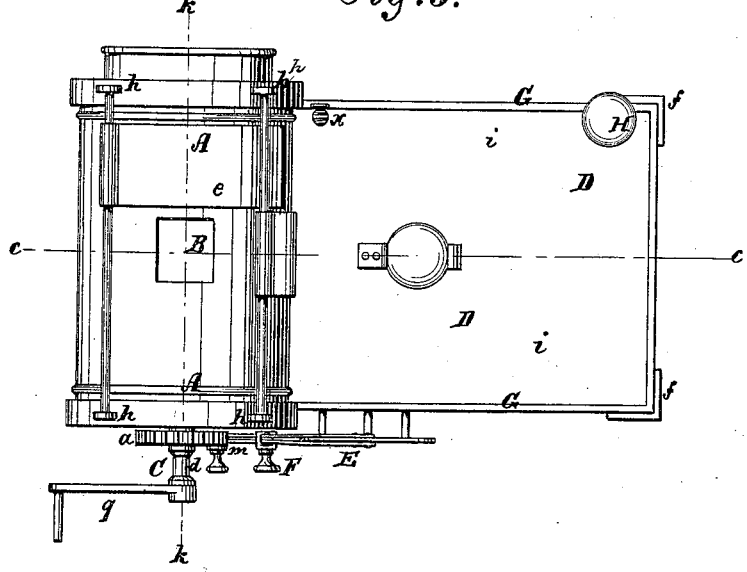
Figure 4:
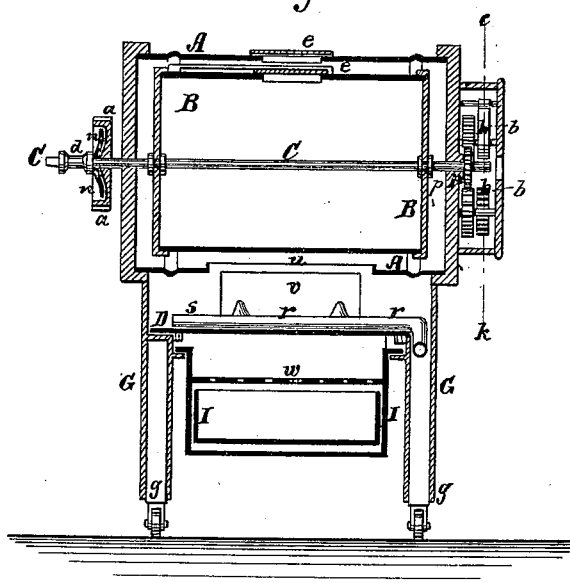
Figure 5:
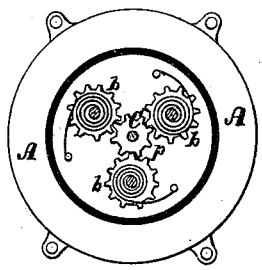

Figure 1 is a side view of the roaster and counter, showing the escape-wheel, pawls, and pendulum which regulate the motor; also, the automatic figure, and the decorated apron. Fig. 2 is a vertical longitudinal section of the apparatus, the line $c\ c$ in Fig. 3 indicating the plane of section. Fig. 3 is a top view of the same; Fig. 4, a vertical transverse section of the same on the line $k\ k$, Fig. 3. Fig. 5 is a detail vertical section of the line $c\ k$, Fig. 4.

Similar letters of reference indicate corresponding parts.

A in the drawing represents the outer case, which is of cylindrical form, and made of any suitable metal. B is a cylinder, which I make of Russia or other sheet iron. The cylinder B is made of suitable size to allow it to revolve inside of case A, through which extends the shaft C, on which the cylinder B is mounted. This shaft C projects through on one end of A sufficiently far to admit of a ratchet or escape wheel, $a$, to be fastened, as also to attach a crank-handle, $q$, for winding the shaft C; also projects through the other end of A sufficiently far to allow the attachment of a series of springs. A drum, $d$, may also be mounted upon the shaft C, for the winding of a weight, which weight and springs may be used separate or in combination. The case A and cylinder B have corresponding apertures, for the putting in and taking out of nuts and coffee. These apertures are closed by sliding doors $e\ e$, as shown in Fig. 2. D is the counter; it is made of any suitable metal, and has iron corner-pieces $f$, for attaching legs $g$ by suitable means. The case A is provided with cast heads, with flanges $h$, to bolt and screw together. The counter D is made with a double bottom, $i$ and $j$, so as to allow it to be heated with a burner, $t$, in it; or it may be kept hot from the same heat that does the roasting. E is an automatic figure, cut out of any metallic sheeting, and connected by joints with a pendulum, F, from which pawls $m\ m$ extend to the ratchet or escape wheel $a$. The figure will thus vibrate in conformity with the pendulum and pawls, or any suitable governor to keep the cylinder in motion. The ratchet or escape wheel $a$ is provided with a click or catch, $n$, that allows the cylinder B to be turned the reverse way in winding up the springs $b$ or weight, also allowing the pawls $m$ hold it to its place when wound up. The pawls $m$ are formed so as to pass over a revolving drum, $o$, or stationary rest; or the pawls $m$ may be in form so as to be a part of the pendulum F, to act alternately in receiving the power from the escape-wheel $a$. The pendulum F is made of suitable length, with a ball attached to govern the motion. The spring $b$, or springs, may be applied, a single one, direct on the cylinder-shaft; but preferably a series of two or more surrounding a pinion, $p$, which pinion $p$ is or may be attached to the cylinder-shaft C, and arranged so that in winding the shaft C all the springs $b$ wind up at one time, thereby allowing the use of gearing for gaining time in running, also allowing the escape-wheel $a$ to govern all the wheels of the springs $b$, instead of requiring a separate ratchet for each wheel. An apron, G, is formed of any suitable material, preferably sheet metal, and may surround all sides of the counters D, or only one side or more. The counter D is formed of sheet metal, and so arranged with apertures that the case A, which supports the cylinder B, rests directly over the main burner $r$. Under the roaster and counter are placed pipes $s\ s$ and burners $r\ t$, respectively, and a retort, H, or supply-chamber for fuel, such as naphtha or any volatile material, is connected with these pipes and supported above the counter. The counter D may have a separate heating-burner, $t$, as shown, or it may be supplied with heat from the burner $r$, that does the roasting, through the aperture $u$. In addition to the provision of the use of volatile fluid as fuel, a grate, $w$, is arranged under the roaster as a convenience when volatile fluids are difficult to obtain; or coal fuel may be used in lieu of volatile fuel whenever preferred. The pipes $s$ are provided with cocks to regulate the flow of fluids. Above the counter is also arranged a pipe and burner, $x$, as a night light, and may have a separate fountain, or may be fed from the fountain H, which supplies the burner in the counter and under the roaster. The spring or springs $b$, or weight, either separate or combined, are wound up by a crank, $q$, and held at any given point with the clutch $n$ on the escapement-wheel $a$. The rotary cylinder B is filled through the apertures, and when the roasting is completed they are dumped out on the counter D, through the lower aperture in the case A. Fuel may be applied through pipes or burners from gas or volatile fluids, as stated, or fire may be applied by charcoal or other fuel on the grate $w$, provided therefor in the box I, under the cylinder B, and the heat will pass through the hot-air chamber or flue $v$ in the counter D; or heat may be applied by the burner $t$ in the flue $v$, direct, independent of the roaster. The box I, with the grate $w$, may be made stationary with the counter D, or, preferably, detached or movable back and forth from the cylinder B into the flue $v$, as desired. The legs $g$ may be threaded in the under side to allow casters to be screwed in; or a threaded-cap caster may be screwed on the outside, by which the motion of the apparatus over the ground is facilitated.

The principle and arrangement of roasting nuts and coffee in the hot-air case by the use of pipes and burners, and volatile fluids as fuel, are not claimed as new in this invention. It is important to nut and coffee dealers to have the improvements herein described, together with the described features of decoration, as the latter increases the sale of nuts and coffee. A nut and coffee counter provided with a hot air or heating chamber is not claimed as new in this invention.

Having thus described my invention, I claim as new and desire to secure by Letters Patent—

In a nut and coffee roaster constructed as described, the driving mechanism $b\ p$ and pendulum attachment F $m\ n\ o$, arranged, in relation to the roasting-cylinder B, in such manner that the several springs are wound up by a single movement of the shaft C, whereby, also, the contents of the cylinder are given reverse motion, substantially as and for the purpose specified.

D'ALEMBERT T. GALE.

Witnesses:
C. SEDGWICK,
T. B. MOSHER.